United States Patent [19]

Abecassis et al.

[11] Patent Number: 4,703,717

[45] Date of Patent: Nov. 3, 1987

[54] MANUFACTURING CHAIN FOR HOMEOPATHIC MEDICAMENTS, PARTICULARLY FOR THE IMPREGNATION OF GRANULES OR PELLETS

[75] Inventors: Jacky R. Abecassis, Ecully; Bernard Baum, Limonest; André-Marcel Favier, Dagneux; Patrice C. Levert, Craponne, all of France

[73] Assignee: Laboratoires Boiron, Lyons, France

[21] Appl. No.: 808,637

[22] Filed: Dec. 13, 1985

[30] Foreign Application Priority Data

Dec. 19, 1984 [FR] France ............................ 84 19948

[51] Int. Cl.$^4$ .............................................. B05C 5/00
[52] U.S. Cl. ..................................... 118/698; 118/19;
118/20; 118/25; 118/303
[58] Field of Search ...................... 118/19, 25, 20, 24,
118/75, 303, 698, 697; 427/3

[56] References Cited

U.S. PATENT DOCUMENTS

| | | | |
|---|---|---|---|
| 3,381,659 | 5/1968 | Rieckmann et al. | 118/19 |
| 4,133,290 | 1/1979 | Melliger | 118/19 X |
| 4,168,674 | 9/1979 | Futter | 118/19 X |

FOREIGN PATENT DOCUMENTS

| | | |
|---|---|---|
| 1288469 | 5/1961 | France. |
| 2137170 | 12/1972 | France. |
| 2258226 | 8/1975 | France. |

Primary Examiner—John E. Kittle
Attorney, Agent, or Firm—Sandler & Greenblum

[57] ABSTRACT

This invention relates to the impregnation of small spheres of sugar with an aqueous liquor. Driven in rotation by rollers, an inclined bottle lies opposite the suction of a ring. By its programmed nozzles, a flask may spray a jet of liquor, blow air or remain at rest. Programmation is effected from a control desk. The invention is more particularly applicable to the mass-production, in sterile manner, of granules or pellets for homeopathy, such manufacture being on an industrial scale and eliminating the risks of errors.

20 Claims, 4 Drawing Figures

MANUFACTURING CHAIN FOR HOMEOPATHIC MEDICAMENTS, PARTICULARLY FOR THE IMPREGNATION OF GRANULES OR PELLETS

The present invention relates to an installation for the chain production of homeopathic medicaments, and more particularly, although not exclusively, to the impregnation of pellets or granules.

As is known, most homeopathic medicaments are in the form of small spheres of sugar (diameter: about 4 millimeters for granules; about 2 millimeters for pellets), impregnated with an aqueous dilution containing the active ingredient. Up to the present day, such impregnation of a very large number of granules or pellets has been effected manually, particularly as far as impregnation is concerned. In other words, this necessitates considerable man-power, and may give rise to errors in the counting of cycles or in the marking of the bottles containing the pellets or granules, and the flasks containing the impregnation liquors. Furthermore, elimination of the possible impurities is of considerable importance in the particular case of homeopathy, being given that, due to the extreme dilution of the active principles, a possible impurity risks being present in the granules or pellets with a concentration higher than that of the active ingredient proper. For all these reasons, manufacture of homeopathic medicaments, for relatively small quantities, is at present effected by processes which are often manual.

It is an object of the present invention to avoid these drawbacks, by producing a chain for manufacturing homeopathic medicaments on an industrial scale, eliminating any risk of error or of contamination.

A manufacturing chain according to the invention, particularly for treating small spheres of sugar contained in bottles, by impregnating them with a liquor contained in a flask, is characterized in that it comprises:
at least one station with inclined rollers on which a bottle may be placed, with its open neck facing upwardly, the rotating opening of the neck then being close to a suction ring provided, at its centre, with an opening;
at least one flask surmounted by two transverse nozzles, namely:
a first nozzle of which the rear end bears an end piece for connection thereof with a first source of air under pressure in order that its front end may blow air,
and a second nozzle, whose front end is close to the front end of the first nozzle, whilst its rear end is immersed in the liquor inside the flask, the upper part of the interior of the latter finally being connected to an end piece for connection thereof with a second source of compressed air;
control and programming means for programming:
the rotation of the rollers driving the bottle,
the blowing of compressed air into the bottle by the first nozzle of the flask,
and the spraying of liquor into the bottle by the second nozzle of the flask.

According to another feature of the invention, a difference in flowrate of compressed air is maintained between the two nozzles, with the result that, at any moment, the flowrate of air sucked by the ring is greater than the maximum flowrate of air and of liquor blown into the bottle.

According to a further feature of the invention, the installation comprises a plurality of stations for the treatment of bottles of virgin granules or pellets, and an endless conveyor on which said bottles are disposed.

According to another feature of the invention, the suction rings are connected to a central manifold, maintained constantly under depression.

According to another feature of the invention, each suction ring is connected to the general air suction manifold by a non-return valve automatically stopping any excess pressure likely to be produced in the manifold, so as to avoid any risk of return of air via the suction ring.

According to another feature of the invention, a weighing station is provided upstream of the endless conveyor, where each bottle is weighed, with its contents.

According to another feature of the invention, the programming means comprises a device making it possible to have the periods when the liquor is sprayed inside the bottle succeeded by periods when the first nozzle ceases to spray, whilst the second nozzle blows drying air inside the bottle which continues to rotate.

The invention will be more readily understood on reading the following description with reference to the accompanying drawings, in which.

Figure 2:
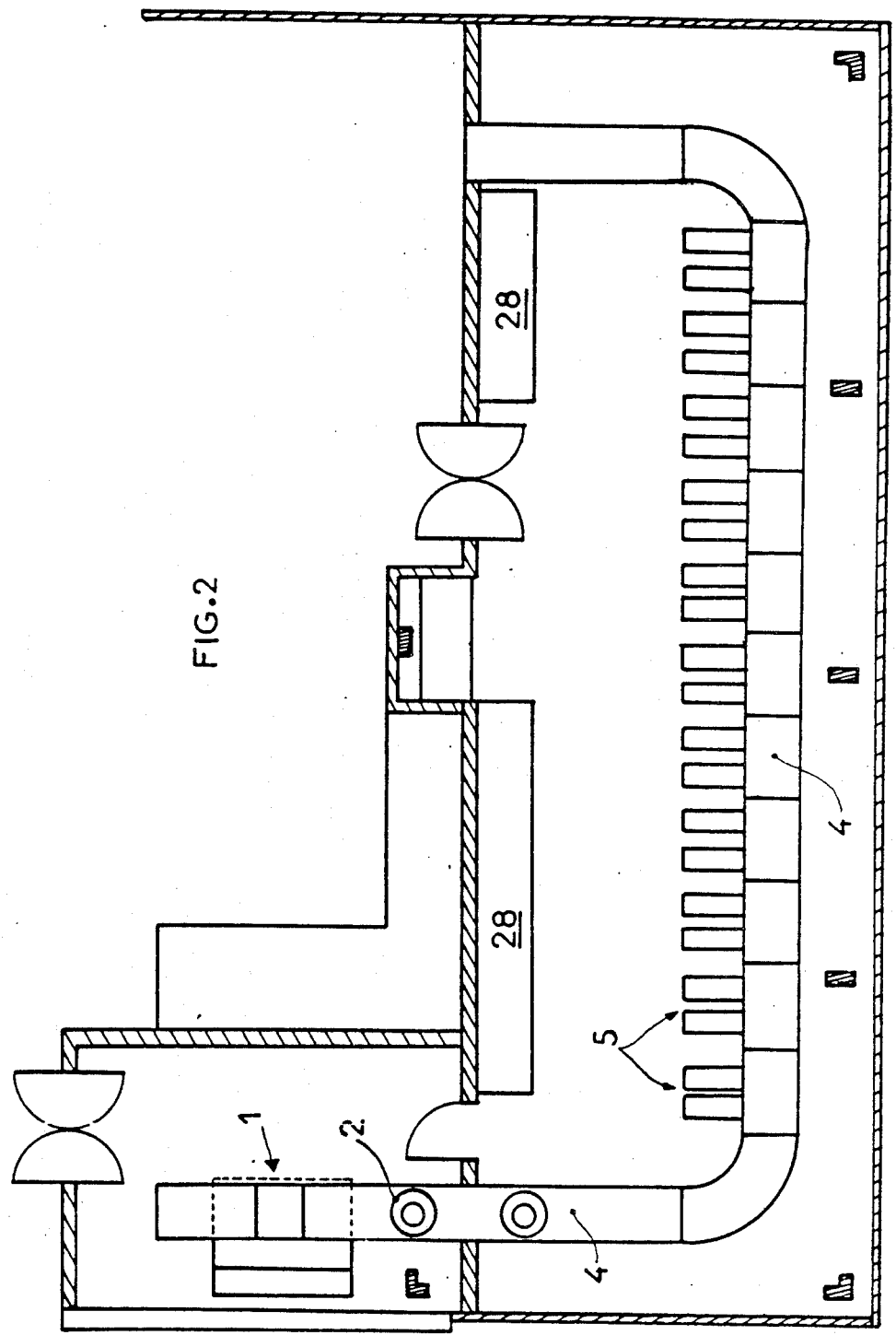
FIG. 2 is a plan view showing the implantation of the whole of the manufacturing chain.
Figure 3:
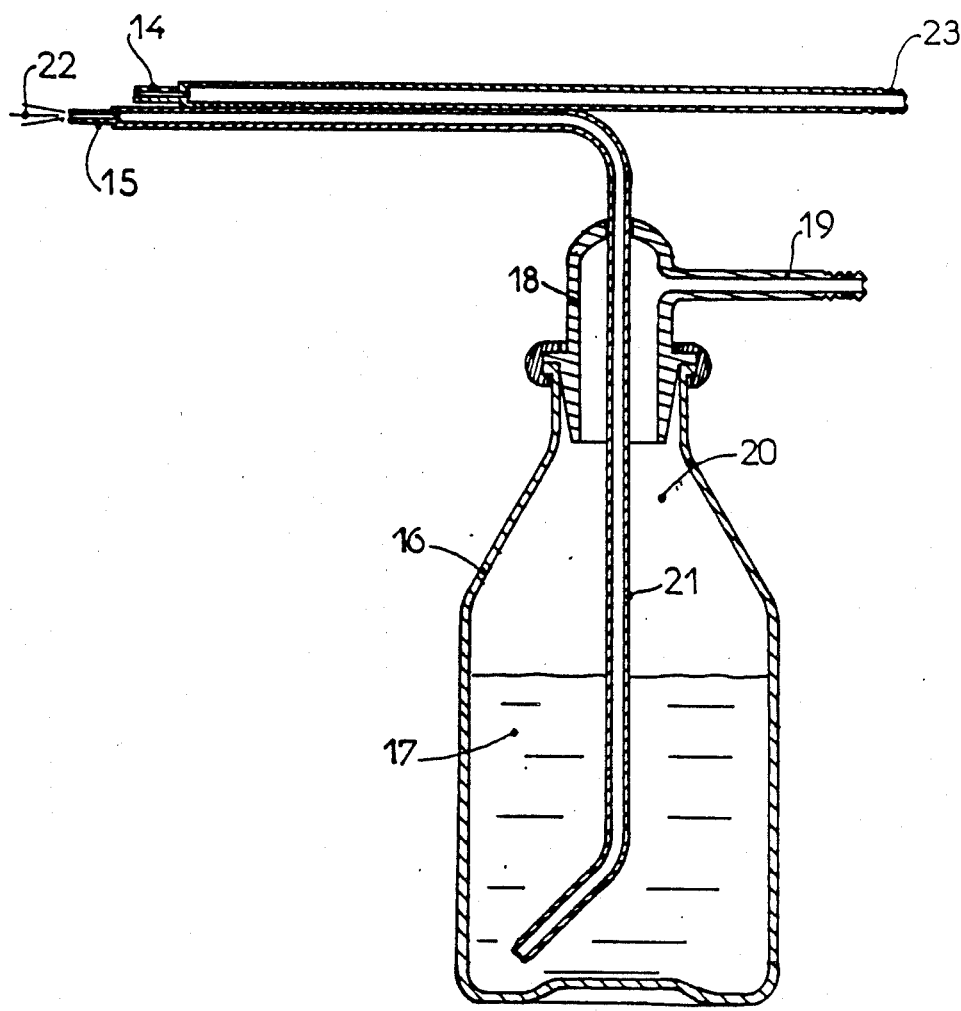
FIG. 3 is a vertical section through a flask equipped with its two upper nozzles.

Referring now to the drawings, the installation illustrated in FIG. 2 comprises a weighing station 1 for weighing bottles 2 of which each contains spheres of sugar 3, intended to be impregnated, in order to constitute homeopathic pellets or granules.

At the weighing station 1, a pair of identifying tickets is printed for each bottle. One of the tickets of this pair is stuck to the bottle 2, whilst the other is recorded in the laboratory's register of manufacture.

On leaving the weighing station 1, the bottles 2 are conveyed, by an endless conveyor 4, towards a series of impregnation stations 5, all made in accordance with the same principle.

Figure 1:
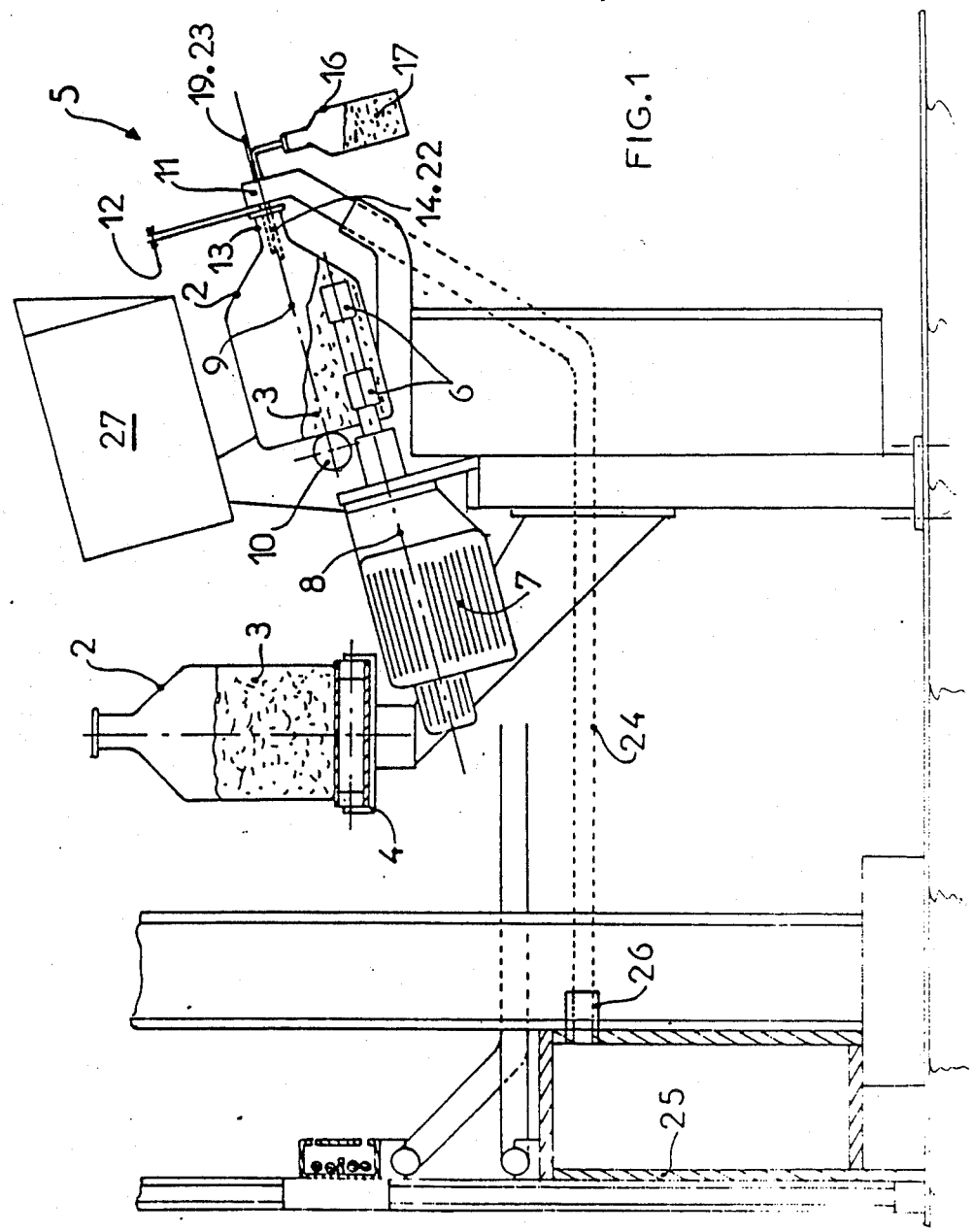
FIG. 1 is a side view with part section of an impregnation station according to the invention.

The impregnation station 5 illustrated in FIG. 1 comprises two pairs of rollers 6 of which at least one is driven in rotation by a gear-down motor 7.

The geometrical axis 8 of the assembly is inclined so that a bottle 2 lying on the rollers 6 rotates about its inclined geometrical axis 9, whilst its bottom bears against a central stop 10.

Station 5 further comprises a hollow suction ring 11 which is located, with a clearance 12, in front of the opening of the neck 13 of the bottle 2. Along axis 9, the hollow ring 11 is traversed by the upper and lower nozzles 14 and 15, respectively, of a flask 16, which contains, in the form of a liquor 17, the active ingredient with which it is desired to impregnate the pellets or granules. This liquor may be aqueous or alcoholic.

In its lower part, the flask 16 is obturated by a stopper 18 comprising, to the rear, a first connector 19 adapted to connect it to a first source of compressed air. This connector 19 communicates with the upper interior space 20 in flask 16, i.e., when the pressure is sent into the connector 19, the liquor 17 is delivered into a tube 21 which is immersed therein, and which is connected to the first spray nozzle 15. When the pressure is sent into the first connector 19, a jet 22 of liquor 17 is thus sprayed by the first nozzle 15.

Furthermore, the second nozzle 14 is connected to a second rear end piece 23 provided to be connected to a second source, of compressed air.

Flask 16 may advantageously be provided with removable impregnation nozzles, maintained on the flask by means of a clamp fitting, allowing resistance to excess pressure.

The suction ring 11 is connected by a pipe 24 to a general suction manifold 25, common to all the stations 5 beneath which it extends.

A non-return valve 26 is interposed between each pipe 24 and the general manifold 25, in order to avoid any possible accidental excess pressure in the manifold delivering, via ring 11, inside the bottle 2 in the course of impregnation.

Furthermore, control and programming means 27, containing the necessary electronic circuits, allow the operator to programme station 5 and to monitor, at every instant, the state of advance of the programme.

In the vicinity of the endless conveyor 4, along the impregnation stations 5, are located storage cabinets 28, inside which the various flasks 16 necessary for manufacture are stored.

Figure 4:
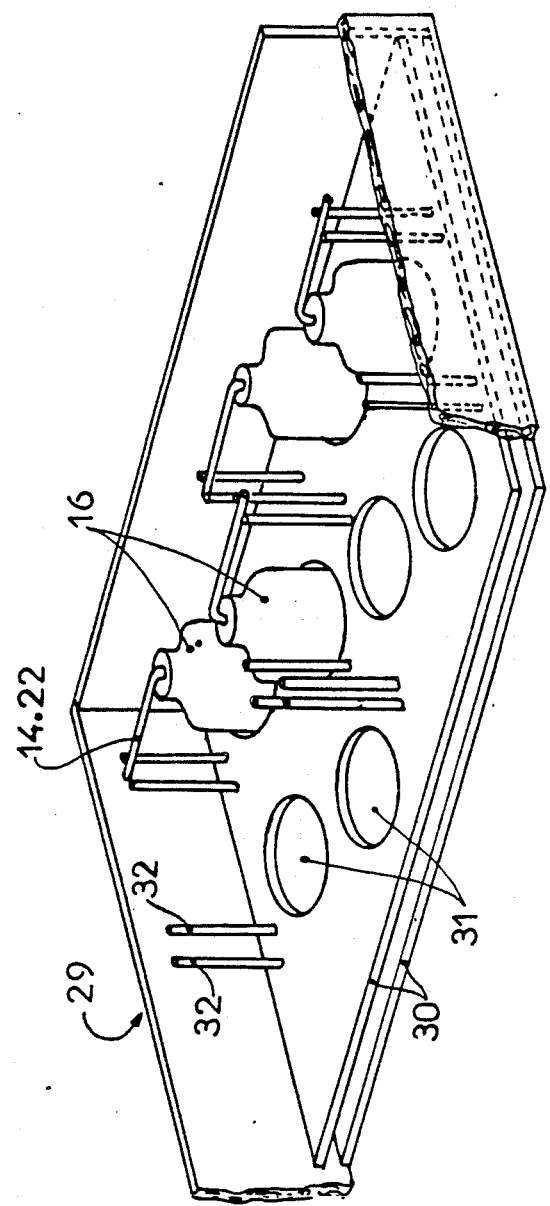
FIG. 4 is a view in perspective with section, showing the arrangement of the flasks in a storage drawer according to the invention.

Each of these cabinets 28 comprises drawers 29 whose interior structure is illustrated in FIG. 4. Each drawer 29 comprises a double bottom 30, over which are distributed circular recesses 31 disposed in quincunx. The diameter of each recess 31 is equal, to within the clearance, to the outer diameter of each flask 16 which is housed therein.

Furthermore, in front of each recess 31 rise two vertical guide rods 32 between which the horizontal rod constituted by the two nozzles 14 and 22 of a flask 16 is housed. This arrangement makes it possible to juxtapose inside the drawer 29 a maximum number of flasks 16, whilst guaranteeing that the nozzles 14, 22 of each of them do not risk coming into contact with another flask, which would lead to contamination from one liquor 17 to the other.

Operation is as follows:

The operator takes a bottle 2 from the conveyor 4 (FIGS. 1 and 2) and places it on the rollers 6 of his station 5. Bottle 2 is then driven in rotation, which ensures permanent mixing for the spheres of sugar 3 which it contains. Furthermore, the operator positions the flask 16 containing the desired liquor 17 in a predetermined calibrated quantity. Once in position, this flask 16 penetrates, by its two nozzles 14 and 22, inside the neck 13 of the bottle 2. During the drying phase, the ring 11 sucks both air coming from inside the bottle 2 and air coming from the ambient atmosphere, attracted by the clearance 12.

The installation advantageously possesses an outside time-switch adjustable by the operator, which regulates the duration of impregnation as a function of the flow-rate of the impregnation nozzle 15. The quantity of liquor 17 present in the flask 16 no longer needs to be calibrated.

On his control and programming device 27, the operator programmes the cycle as a function of the labels borne on the one hand by the flask 16 and on the other hand by the bottle 2.

The operator having connected the rear connectors 19 and 23 of the flask 16 respectively on the first and on the second source of compressed air, he uses said device 27 for programming the air blowing phases.

A cycle of impregnation may thus take the following form:

in a first step, the first nozzle 15 projects an atomized jet 22 inside the bottle 2, whilst the latter is rotating; this corresponds to a phase of impregnation;

the first nozzle 15 then stops blowing and the bottle 2 continues to rotate; this is a homogenization phase;

the second nozzle 14 blows ultra-filtered air into the bottle 2, whilst the ring 11 sucks; this is a drying phase;

these three successive operations are repeated several times, for example twice;

bottle 2 is then removed and stored. The operation of impregnation is terminated.

The air blowing pressures are, of course, monitored.

In particular, it is seen that the installation according to the invention enables the operator to work as desired, either manually or in automatic mode.

As indicated hereinbefore, the use of cabinets 28 of which the drawers are as shown in FIG. 4, makes it possible both to facilitate storage of the impregnation liquors 17 and to eliminate any risk of errors in manufacture.

The possibility of using removable nozzles renders the system polyvalent.

The presence of the outside time-switch allows an appreciable saving of time since it is no longer necessary to calibrate the quantities of liquor 17 present in the flasks 16.

This device is therefore perfectly applicable in the pharmaceutical industry where any risk of contamination must be strictly prohibited.

What is claimed is:

1. An installation for the impregnation of small spheres of sugar contained in bottles by means of a liquor contained in a flask, wherein said bottles each comprise a neck having an opening therein, wherein said installation comprises
at least one station comprising:
(a) a hollow suction ring having a central opening;
(b) a plurality of inclined rollers adapted to support each of said bottles in such a position that said opening in said neck of each bottle faces upwardly and faces said opening in said hollow suction ring, wherein said rollers are adapted to rotate said neck of each bottle; and
(c) at least one flask, adapted to receive said impregnation liquor, wherein said flask comprises first and second transverse nozzles surmounting said flask,
(i) wherein said first nozzle comprises: a rear end and a front end, wherein said rear end comprises an end piece comprising means for connection with a first source of compressed air under pressure, and wherein said front end comprises means for blowing air in response to connecting said rear end to said source of air under pressure;
(ii) wherein said second nozzle comprises: a front end close to the front end of said first nozzle, and a rear end adapted to be immersed in the liquor inside said flask, and wherein said second nozzle comprises means for spraying liquor into each bottle;
(iii) wherein the upper part of the interior of said flask comprises an end piece comprising means for connection to a second source of compressed air;

(iv) wherein said first and second nozzles comprise means for connecting to each bottle through said opening in said bottles; and (d) means for controlling the following actions during an impregnation cycle:

(i) the rotation of the rollers driving the bottle;

(ii) the blowing of compressed air into the bottle by the first nozzle of the flask, ; and (iii) the spraying of liquor into the bottle by the second nozzle of the flask.

2. The installation of claim 1, further comprising means for maintaining a difference in the flow rates of compressed air, through said first nozzle and liquor through said second nozzle whereby the flow rate of air sucked by said suction ring is greater than the maximum flow rates of air and liquor blown into said bottle.

3. The installation of one of claims 1 and 2, further comprising:

a plurality of said stations for treating a plurality of bottles of virgin granules or pellets; and an endless conveyor for conveying said bottles to said at least one station.

4. The installation of claim 3, further comprising a plurality of suction rings and a central manifold connected to said plurality of suction rings, wherein said central manifold is constantly maintained under reduced pressure.

5. The installation of claim 4, further comprising a non-return valve automatically preventing any excess pressure produced in the manifold from communicating to said bottle, so as to prevent air from said manifold from flowing into said bottle via the suction ring.

6. The installation of claim 3, further comprising a weighing station positioned upstream of said endless conveyor, wherein said weighing station weighs each bottle and the contents of each bottle.

7. The installation of claim 1, wherein said control means comprises:

means for actuating the spraying of said liquor inside said bottle by said second nozzle during a first period of time while said rollers rotate said bottle;

means for causing said second nozzle to cease spraying while said rollers continue to rotate said bottle during a second period of time later than said first period of time; and means for blowing drying air into said bottle with said first nozzle while said rollers continue to rotate said bottle during a third period of time later than said second period of time.

8. The installation of claim 7, wherein controlling means comprises an outside time switch, adjustable by an operator, for regulating the duration of impregnation of the granules or pellets, as a function of the diameter of the impregnation nozzle.

9. The installation of claim 1 wherein said plurality of rollers comprise means for supporting and rotating one bottle at a time.

10. The installation of claim 9 in combination with said bottle.

11. The installation of claim 10 in combination with said flask.

12. The installation of claim 11 in combination with said liquor.

13. The installation of claim 1 wherein said first and second nozzles extend through said suction ring into said opening in said neck of said bottle, wherein said suction ring is sufficiently close to said opening in said neck of said bottle so that said first and second nozzles extend into said bottle.

14. An apparatus for impregnating elements contained in at least one bottle with a fluid in a container, wherein said bottle comprises a neck having an opening therein, said apparatus comprising:

(a) at least one station comprising:

(i) a suction ring; and (ii) means for rotating said bottle and supporting said bottle such that said opening in said bottle faces towards said suction ring; and (b) a first element adapted to be connected to said container, said bottle, and a source of compressed air, wherein said first element extends through said suction ring, and wherein said first element comprises means for blowing air into said bottle; and (c) a second element adapted to be immersed in said fluid in said container and adapted to be introduced into said bottle, wherein said second element extends through said suction ring, and wherein said second element comprises means for spraying said fluid into said bottle.

15. The installation of claim 14 in combination with said container, wherein said installation further comprises a manifold for applying a pressure to said suction ring.

16. The installation of claim 15 in combination with said fluid.

17. The installation of claim 16 in combination with said bottle.

18. The installation of claim 14 in combination with said container, wherein said first and second elements comprise first and second nozzles, respectively, wherein said rotating means comprises a plurality of inclined rollers, wherein said container comprises a flask, wherein said first and second nozzles are mounted on said flask, wherein said nozzle comprises a front end and a rear end, wherein said rear end comprises means for connection to a first source of air under pressure, wherein said front end comprises means for blowing said air under pressure into said bottle, wherein said second nozzle comprises a front end and a rear end, wherein said rear end of said second nozzle is immersed in said fluid in said flask, wherein said front end of said second nozzle comprises means for spraying said fluid into said bottle, wherein said flask comprises means for connection to a second source of compressed air.

19. The installation defined by claim 14 further comprising means for controlling:

the rotation of said rotating means for rotating said bottle;

the blowing of said compressed air into said bottle by said first element; and the spraying of said fluid into said bottle by said second element.

20. The installation defined by claim 19 wherein said control means further comprises:

means for actuating the spraying said fluid inside said bottle by said second element during a first period of time while said rotating means rotates said bottle;

means for actuating said second element to cease spraying while said rotating means continue to rotate said bottle during a second period of time later than said first period of time; and means for blowing drying air into said bottle with said first element while said rotating means continue to rotate said bottle during a third period of time later than said second period of time.

* * * * *

UNITED STATES PATENT AND TRADEMARK OFFICE
CERTIFICATE OF CORRECTION

PATENT NO. : 4,703,717

DATED : November 3, 1987

INVENTOR(S) : Jacky R. ABECASSIS et al.

It is certified that error appears in the above-identified patent and that said Letters Patent is hereby corrected as shown below:

Title Page:

```
        On the inventor's front page, change "Baum" to
---Baume---.
        At column 6, line 36, insert ---first--- between
"said" and "nozzle".
```

Signed and Sealed this

Twenty-ninth Day of November, 1988

Attest:

DONALD J. QUIGG

*Attesting Officer*

*Commissioner of Patents and Trademarks*